United States Patent
Mok et al.

(10) Patent No.: US 10,122,890 B2
(45) Date of Patent: Nov. 6, 2018

(54) IMAGE FORMING APPARATUS AND TANGIBLE COMPUTER-READABLE RECORDING MEDIUM

(71) Applicant: Konica Minolta, Inc., Tokyo (JP)

(72) Inventors: Chun Ho Michael Mok, Kanagawa (JP); Hirohisa Sugimoto, Kanagawa (JP); Eriko Moriyama, Tokyo (JP); Isao Terazono, Tokyo (JP); Tsutomu Yoshimi, Saitama (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/441,028

(22) Filed: Feb. 23, 2017

(65) Prior Publication Data
US 2017/0163845 A1 Jun. 8, 2017

Related U.S. Application Data

(62) Division of application No. 14/086,752, filed on Nov. 21, 2013.

(30) Foreign Application Priority Data

Nov. 30, 2012 (JP) .................. 2012-262709

(51) Int. Cl.
G06F 3/12 (2006.01)
H04N 1/00 (2006.01)
H04N 1/32 (2006.01)

(52) U.S. Cl.
CPC ....... H04N 1/32657 (2013.01); G06F 3/1275 (2013.01); H04N 1/0083 (2013.01);
(Continued)

(58) Field of Classification Search
CPC ...... G06F 3/121; G06F 3/1236; G06F 3/1203; G06F 3/1287; G06F 3/1263; G06F 3/126;
(Continued)

(56) References Cited

U.S. PATENT DOCUMENTS 6,130,757 A * 10/2000 Yoshida ............. H04N 1/00915
358/1.14
2002/0051171 A1 5/2002 Hama
(Continued)

FOREIGN PATENT DOCUMENTS

JP 2007-299040 11/2007
JP 2008-276693 11/2008
(Continued)

OTHER PUBLICATIONS

First Office Action for related Chinese Patent Application No. 201310625359.3 dated Jan. 19, 2016, 7 pages.
(Continued)

Primary Examiner — Chad Dickerson
(74) Attorney, Agent, or Firm — Squire Patton Boggs (US) LLP

(57) ABSTRACT

Disclosed is an image forming apparatus including: a reading unit; a print unit; a transmitting unit; an execution instruction receiving unit; and a control unit, wherein in case that before a predetermined time elapses since the execution instruction receiving unit receives a first execution instruction for executing a first job including reading of the original set to the reading unit, the execution instruction receiving unit receives a second execution instruction for executing a second job including the reading of the original, and in case that the first execution instruction and/or the second execution instruction is a remote instruction, the control unit controls the transmitting unit so as not to transmit the image of the original even though a transmitting instruction for (Continued)

transmitting the image of the original is included in the first execution instruction and/or the second execution instruction.

10 Claims, 11 Drawing Sheets

(52) U.S. Cl.
CPC ....... H04N 1/0096 (2013.01); H04N 1/00127 (2013.01); H04N 1/00204 (2013.01); H04N 1/00798 (2013.01); H04N 1/32144 (2013.01); H04N 1/32641 (2013.01); H04N 2201/0094 (2013.01)

(58) Field of Classification Search
CPC .............. G06F 3/1273; H04N 1/00811; H04N 1/00912; H04N 1/00915; H04N 1/32545
USPC ......... 358/1.11–1.18, 400–404; 710/1, 8–12, 710/15–21
See application file for complete search history.

(56) References Cited

U.S. PATENT DOCUMENTS

| | | | |
|---|---|---|---|
| 2002/0063884 A1* | 5/2002 | Bhogal | G06F 3/1211 358/1.15 |
| 2002/0126307 A1 | 9/2002 | Ohwa | |
| 2003/0035139 A1* | 2/2003 | Tomita | H04N 1/00204 358/1.15 |
| 2005/0157336 A1 | 7/2005 | Koike et al. | |
| 2008/0246993 A1* | 10/2008 | Murakami | G06F 3/1207 358/1.15 |
| 2009/0180141 A1* | 7/2009 | Takaishi | G03G 15/5075 358/1.15 |
| 2011/0013215 A1 | 1/2011 | Yonezawa et al. | |

FOREIGN PATENT DOCUMENTS

| | | |
|---|---|---|
| JP | 2009-206548 | 9/2009 |
| JP | 2011-234194 A | 11/2011 |
| JP | 2012-051376 | 3/2012 |
| JP | 2012-090077 | 5/2012 |
| WO | WO 2008/117785 | 10/2008 |

OTHER PUBLICATIONS

Translation of First Office Action for related Chinese Patent Application No. 201310625359.3 dated Jan. 19, 2016, 15 pages.
Translation of the Notice of Reason for Refusal for application No. JP 2012-262709, dated Nov. 27, 2014, 7 pages.
Notice of Reason for Refusal for application No. JP 2012-262709, dated Nov. 27, 2014, 3 pages.

* cited by examiner

IMAGE FORMING APPARATUS AND TANGIBLE COMPUTER-READABLE RECORDING MEDIUM

BACKGROUND OF THE INVENTION

Field of the Invention

The present invention relates to an image forming apparatus which can be remotely controlled from a portable terminal and a tangible computer-readable recording medium therefor.

Description of Related Art

There is a technology in which an image forming apparatus which is a so-called multi function peripheral having a copy function of optically reading an original to print the read image, a function of obtaining image data by reading an original to transmit the obtained image data to an external device, and the like, can be controlled from a remote operation panel, such as a tablet, a portable terminal or the like, and therefore the operability for setting and inputting a job is enhanced (for example, Japanese Patent Application Publication No. 2012-90077).

In case that a multi function peripheral is operated by using remote operation panels, it is assumed that a plurality of users operates the identical multi function peripheral from different remote operation panels almost at the same time. For example, the following situation shown in FIGS. 11A and 11B is assumed. In the assumed situation, the user A sets an original 81 to a document feeder of the multi function peripheral 80 (P1). Then, the user B who is apart from the multi function peripheral 80 transmits a custom instruction for carrying out both the copy of the original 81 and the transmission of the image of the original 81, from the remote operation panel 82 to the multi function peripheral 80 (P2). Immediately after the step P2, the user A who is near the multi function peripheral 80 transmits the copy instruction from the user A's remote operation panel (P3). In FIG. 11B, each step is shown in time sequence.

In this situation, the multi function peripheral 80 carries out the copy of the original 81 which is set by the user A and the transmission of the image of the original 81 in accordance with the custom instruction received from the user B. However, because the copy instruction of the user A is transmitted immediately after the custom instruction of the user B is transmitted (for example, 0.5 second later), the user A mistakenly recognizes the copy operation executed in accordance with the custom instruction of the user B as the copy operation executed in accordance with the copy instruction of the user A. Therefore, the trouble in which the user A does not become aware that the transmission of the image of the original 81 is carried out in addition to the copy of the original 81, could be caused. That is, before the user A becomes aware of the above transmission, the image of the original 81 of the user A is transmitted in accordance with the instruction of the user B and the information of the original is leaked. Also, in case that the user A enters the copy instruction by using the operation panel provided in the multi function peripheral 80, the same trouble could be caused.

SUMMARY

To achieve at least one of the abovementioned objects, an image forming apparatus reflecting one aspect of the present invention comprises:

a reading unit to optically read an original;

a print unit to print an image of the original, which is obtained by the reading unit, on recording paper;

a transmitting unit to transmit the image of the original, which is obtained by the reading unit, to an external device;

an execution instruction receiving unit to receive a job execution instruction; and a control unit to control execution of a job in accordance with the job execution instruction received by the execution instruction receiving unit, wherein in case that before a predetermined time elapses since the execution instruction receiving unit receives a first execution instruction for executing a first job including reading of the original set to the reading unit, the execution instruction receiving unit receives a second execution instruction for executing a second job including the reading of the original, and in case that at least one of the first execution instruction and the second execution instruction is a remote instruction received from an external terminal, the control unit controls the transmitting unit so as not to transmit the image of the original even though a transmitting instruction for transmitting the image of the original is included in both or one of the first execution instruction and the second execution instruction.

Preferably, the control unit instructs the reading unit to start the reading of the original when the execution instruction receiving unit receives the first execution instruction, and monitors whether the second execution instruction is received during the predetermined time after the reading of the original is started.

Preferably, in case that the transmitting instruction for transmitting the image of the original is not included in the first execution instruction, the control unit instructs the image forming apparatus to carry out an operation designated in the first execution instruction, and only in case that the transmitting instruction for transmitting the image of the original is included in the first execution instruction, the control unit monitors whether the second execution instruction is received during the predetermined time after the first execution instruction is received.

Preferably, in case that the first execution instruction is received by an operating unit of the image forming apparatus, the control unit instructs the image forming apparatus to carry out an operation designated in the first execution instruction, and only in case that the first execution instruction is the remote instruction, the control unit monitors whether the second execution instruction is received during the predetermined time after the first execution instruction is received.

Preferably, the image forming apparatus further comprises a warning unit to warn a user in case that the image of the original is not transmitted even though the transmitting instruction for transmitting the image of the original is included in both or one of the first execution instruction and the second execution instruction.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein.

DETAILED DESCRIPTION OF PREFERRED EMBODIMENTS

Hereinafter, preferred embodiments of the present invention will be explained with reference to the accompanying drawings.

Figure 1:
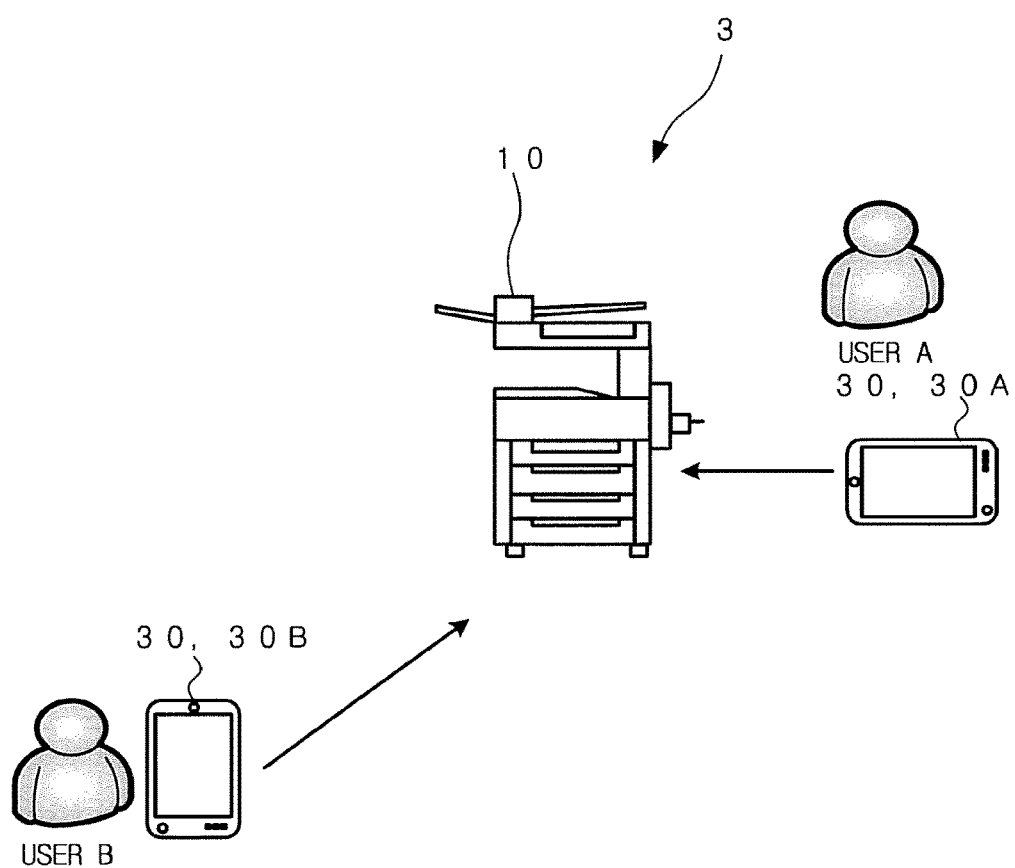
FIG. 1 is a view showing an image forming system including the image forming apparatus according to the first embodiment.

FIG. 1 shows the configuration of the image forming system 3 in which the image forming apparatus 10 according to the first embodiment is used. The image forming system 3 comprises an image forming apparatus 10 and a plurality of portable terminals 30 which can remotely control the image forming apparatus 10. The portable terminal 30 which is used by the user A is referred to as the portable terminal 30A. The portable terminal 30 which is used by the user B is referred to as the portable terminal 30B. The communication between the portable terminal 30 and the image forming apparatus 10 is carried out by using the wireless LAN, the near field communication or the like.

The image forming apparatus 10 is a so-called multi function peripheral having a copy function of optically reading an original to print the read image on recording paper, an original transmission function of transmitting an image data of the read original to an external terminal via a network or in accordance with the facsimile procedure, a printer function of carrying out the printout by forming an image on recording paper based on print data received from a PC (Personal Computer) or the like via the network, a facsimile reception function of printing out an image on recording paper, which is received in accordance with the facsimile procedure, and the like.

The portable terminal 30 may be a dedicated device for remotely operating the image forming apparatus 10, or may be a versatile tablet or a smart phone having an application program for remotely operating the image forming apparatus 10.

Figure 2:
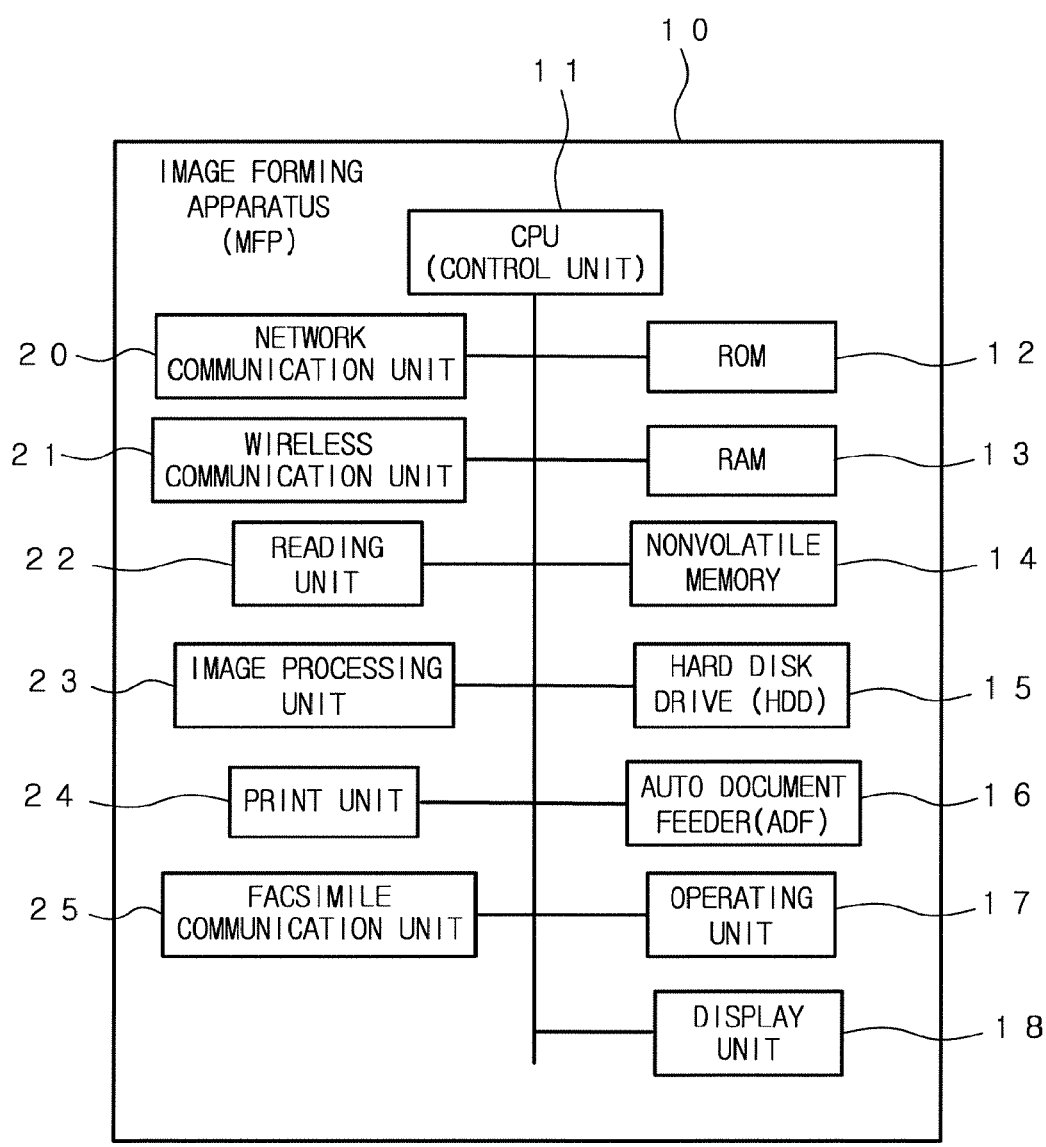
FIG. 2 is a block diagram showing the schematic configuration of the image forming apparatus according to the first embodiment.

FIG. 2 is a block diagram showing the schematic configuration of the image forming apparatus 10. The image forming apparatus 10 comprises a CPU (Central Processing Unit) 11 for wholly controlling the operation of the image forming apparatus 10. The CPU 11 is connected with a ROM (Read Only Memory) 12, a RAM (Random Access Memory) 13, a nonvolatile memory 14, a hard disk drive 15, an auto document feeder (ADF) 16, an operating unit 17, a display unit 18, a network communication unit 20, a wireless communication unit 21, a reading unit 22, an image processing unit 23, a print unit 24, a facsimile communication unit 25, and the like via a bus.

By the CPU 11, a middleware, application programs and the like are executed on an OS (Operating System) program as a base. Further, the CPU 11 has a function as a control unit for controlling the execution of a job in accordance with the job execution instruction received by the operating unit 17, the network communication unit 20 or the wireless communication unit 21. In the ROM 12, various types of programs are stored. By executing various types of processes by the CPU 11 in accordance with these programs, various types of functions of the image forming apparatus 10 are realized.

The RAM 13 is used as a work memory for temporarily storing various types of data when the CPU 11 carries out the process in accordance with the programs, and as an image memory for storing image data, and the like.

The nonvolatile memory 14 is a memory (flash memory) in which the stored contents are not damaged even if the image forming apparatus 10 is turned off, and is used for storing various types of setting information and the like. The hard disk drive 15 is a nonvolatile memory device having large capacity. In the hard disk drive 15, various types of programs and data are stored in addition to print data, image data and the like.

The reading unit 22 has a function of optically reading an original to obtain the image data. For example, the reading unit 22 comprises a light source for irradiating an original with light, a line image sensor for reading the original line by line in the width direction of the original by receiving the reflected light from the original, a moving unit for sequentially moving the reading position line by line in the longitudinal direction of the original, an optical system having lenses, mirrors and the like for guiding the reflected light from the original to the line image sensor and focusing the reflected light on the line image sensor, a converting unit for converting an analog image signal outputted from the line sensor image into digital image data, and the like.

The auto document feeder 16 has a function of feeding the original sheet by sheet from the uppermost sheet of the original set on an original tray to convey the original through the reading position of the reading unit 22 and to discharge the original to a predetermined paper discharge position. The reading unit 22 has a function of reading the original disposed on the platen glass and a function of sequentially reading the original conveyed by the auto document feeder 16.

The operating unit 17 and the display unit 18 constitute an operation panel (operation display unit) for displaying the information and for receiving the operations, such as a job setting, a job execution instruction and the like. The display unit 18 is configured by a liquid crystal display (LCD) and the like, and has the function of displaying various types of operation windows, setting windows, warning windows and the like. The operating unit 17 comprises various types of buttons, such as a start button, a stop button and the like, and a touch panel provided on the display surface of the display unit 18. The touch panel detects the coordinate position on which the contact operation is carried out for the display surface of the display unit 18 by using a pen or the user's finger. Further, the operating unit 17 is one of the execution instruction receiving units, for receiving the job execution instruction (local instruction).

The network communication unit 20 has a function of communicating with the portable terminal 30 or another external device via the network, such as a LAN. The network communication unit 20 has a function of the wireless LAN.

The wireless communication unit 21 has a function of wirelessly communicating with the portable terminal 30 by using the communication method which is different from that of the network communication unit 20. In the wireless communication unit 21, the communication distance is from several meters to several tens meters, and various types of near field communication systems can be adopted as a communication method. The remote instruction which is a job execution instruction received from the portable terminal 30 is received by the network communication unit 20 or the wireless communication unit 21. That is, each of the network communication unit 20 and the wireless communication unit 21 has a function as the receiving unit (or the execution instruction receiving unit) for receiving the job execution instruction (remote instruction) from an external terminal. Further, each of the network communication unit 20 and the wireless communication unit 21 has a function as the transmitting unit for transmitting an image of the original, which is obtained by the reading unit 22, to an external device.

The image processing unit 23 carries out the rasterization processing for converting print data into image data, compression/decompression processing of image data and the like, in addition to the processings, such as enlargement/reduction and rotation of the image.

The print unit 24 has a function of carrying out the printout by forming an image on the recording paper based on print data. In this embodiment, the print unit 24 is configured as a so-called laser printer which comprises a conveying device for the recording paper, a photoconductive drum, a charging device, a laser unit, a developing device, a transfer and separation device, a cleaning device and a fixing device, and which forms an image by the electrophotographic process. Alternatively, the print unit 24 may be another type of printer.

The facsimile communication unit 25 has a function of receiving and transmitting image data from/to an external device having the facsimile function in accordance with the facsimile communication procedure. That is, the facsimile communication unit 25 has a function as the transmitting unit for transmitting an image of the original, which is obtained by the reading unit 22, to an external device.

Figure 3:
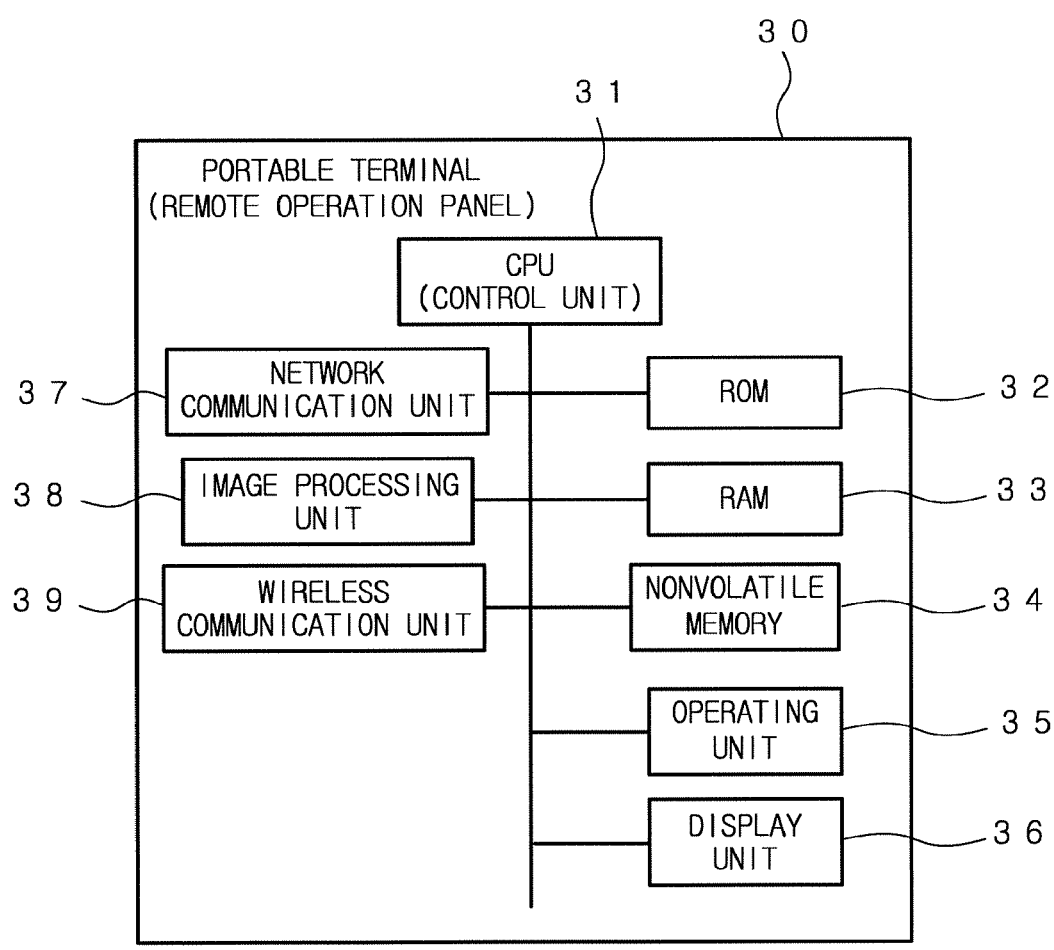
FIG. 3 is a block diagram showing an example of the schematic configuration of the portable terminal for transmitting the remote instruction to the image forming apparatus.

FIG. 3 shows an example of the schematic configuration of the portable terminal 30. The portable terminal 30 transmits the remote instruction for instructing the image forming apparatus 10 to execute the job. In the portable terminal 30, a CPU 31 is connected with a ROM 32, a RAM 33, a nonvolatile memory 34, an operating unit 35, a display unit 36, a network communication unit 37, an image processing unit 38, a wireless communication unit 39, and the like via a bus.

The CPU 31 controls the operation of the portable terminal 30 in accordance with the programs stored in the ROM 32. In the ROM 32, the programs and the fixed data are stored. The RAM 33 is used as a work memory for temporarily storing various types of data when the CPU 31 executes the programs, and the like. In the nonvolatile memory 34, various types of setting information and the application programs are stored.

The display unit 36 is configured by a liquid crystal display and the like. The operating unit 35 is configured by a touch panel provided on the display surface of the display unit 36. The network communication unit 37 has a function of carrying out the data communication with the image forming apparatus 10 or another external device via the network including the wireless LAN. The wireless communication unit 39 has a function of carrying out the near field communication with the image forming apparatus 10. The image processing unit 38 carries out various types of processes, such as rotation, enlargement/reduction, deformation and the like, for image data.

Next, the information leak preventing operation which is carried out by the image forming apparatus 10 according to the first embodiment, will be explained. The operation for preventing the information leak from being caused by transmitting the image of the original set by a user in accordance with the remote instruction of another user before the user who sets the original becomes aware that the image of the original is transmitted, is referred to as the information leak preventing operation.

Figure 4A:
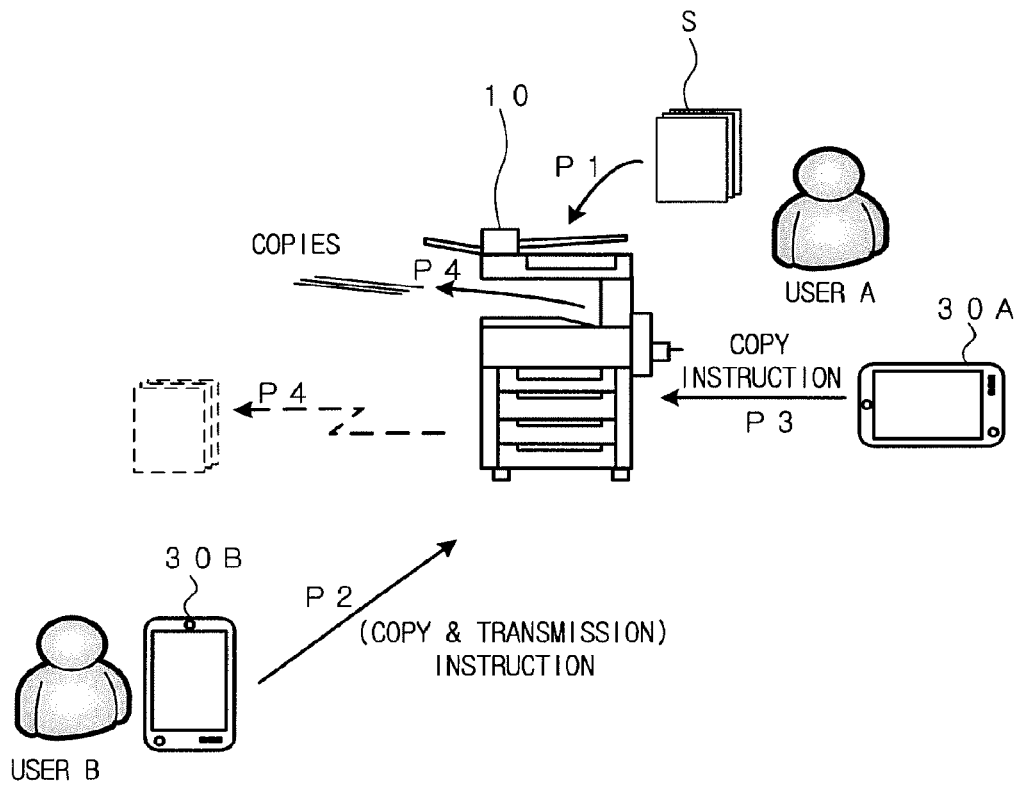
FIGS. 4A and 4B are views showing a workflow and a sequence in case that the image forming apparatus according to the first embodiment carries out the information leak preventing operation.
Figure 4B:
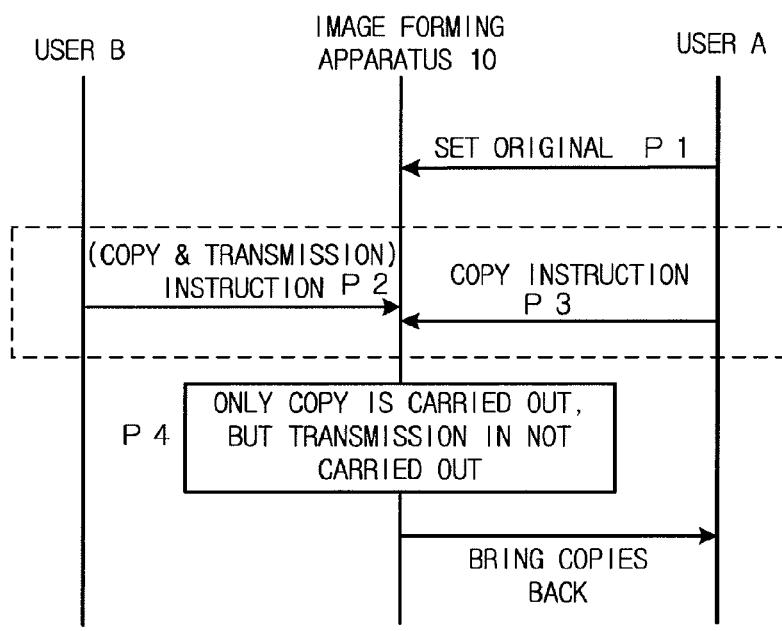

FIG. 4A shows the workflow in case that the information leak preventing operation is carried out. FIG. 4B shows each step in time sequence. The user A sets the original S to the reading unit 22 of the image forming apparatus 10 (P1). Then, the user B who is apart from the image forming apparatus 10 transmits the first remote instruction for instructing the image forming apparatus 10 to execute a job for carrying out both the copy of the original S and the transmission of the image of the original S, from the portable terminal 30B (P2). Immediately after the step P2, the user A who is near the image forming apparatus 10 transmits the second remote instruction for instructing the image forming apparatus 10 to execute a copy job for copying the original S, from the portable terminal 30A (P3). The copy job is a job including the reading of the original S which is set to the reading unit 22. Further, the setting of the original S to the reading unit 22 includes the setting of the original S to the original tray, which is fed by the auto document feeder 16, and the disposing of the original S on the platen glass.

After the original S is set, the CPU 11 of the image forming apparatus 10 judges whether the reception interval between the first remote instruction received from the user B and the second remote instruction received from the user A is within the specified short time (for example, from 1 second to 3 seconds) or not. In case that the above reception interval is within the specified time, that is, in case that the image forming apparatus 10 successively receives the first remote instruction and the second remote instruction within the short time, the image forming apparatus 10 carries out only the copy and does not carry out the transmission of the image of the original.

Because the copy is carried out, the user A brings the copies back. Further, because the image of the original S which is set by the user A is not transmitted to an external device in accordance with the first remote instruction received from the user B, the information leak which is caused by transmitting the image of the original S to an external device before the user A becomes aware of the transmission of the image, is prevented.

Figure 5:
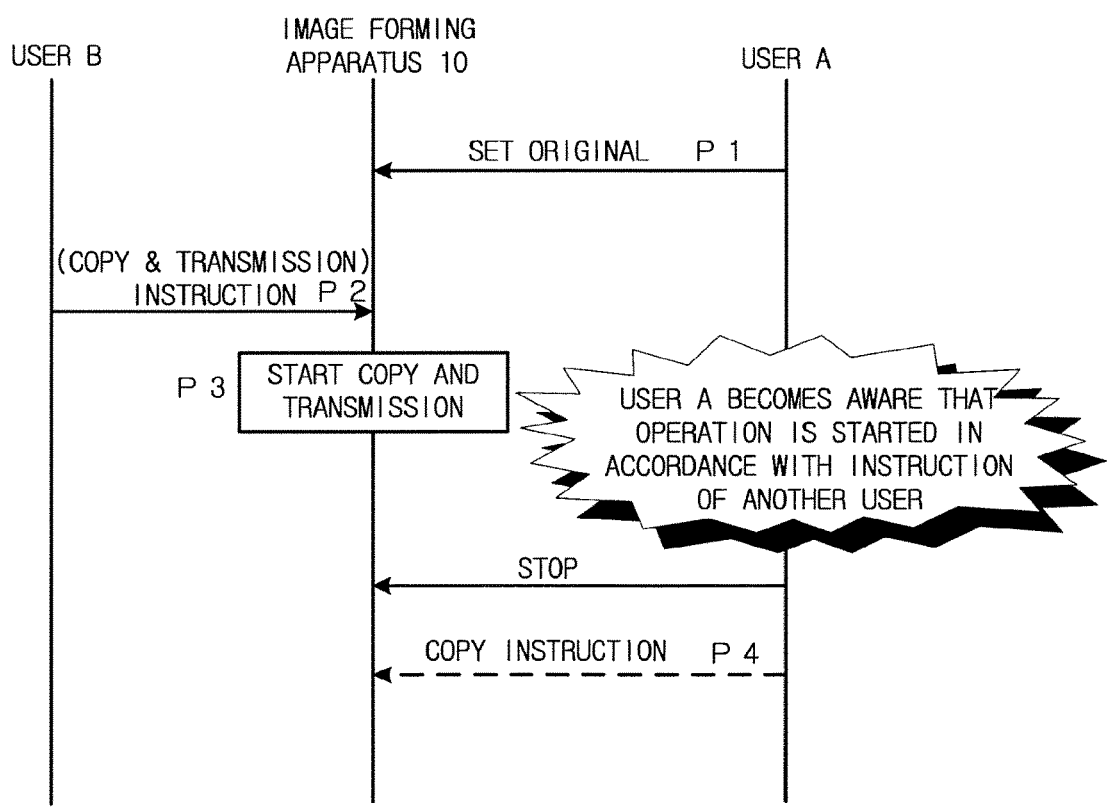
FIG. 5 is a view showing a sequence in case that the user who sets the original becomes aware that the image forming apparatus is operated in accordance with the remote instruction of another user.

As shown in FIG. 5, in case that the reception interval between the remote instruction received from the user B and the remote instruction received from the user A is wide to a certain degree, the problem is not caused even though the image forming apparatus 10 is operated normally in accordance with the received remote instruction. That is, in case that after the user A sets the original (P1), the remote instruction is received from the user B (P2) and the image forming apparatus 10 starts the reading operation for the original in accordance with the remote instruction of the user B long before (for example, about 3 seconds before) the user A transmits the remote instruction (P4), the user A becomes aware that the above reading operation is started in accordance with the remote instruction received from another user because the reading operation is started before the user A transmits the remote instruction. Therefore, the user A can take the action for stopping the operation by using the stop button. On the other hand, in case that the image forming apparatus 10 successionally receives the first remote instruction and the second remote instruction, the user A recognizes that the reading operation for the original is carried out in accordance with the instruction of the user A.

Therefore, in the image forming apparatus 10 according to the first embodiment, only when the first remote instruction for the set original and the second remote instruction for the set original are successionally received, the information leak preventing operation in which the CPU 11 controls the network communication unit 20 or the like so as not to transmit the image of the original even though the transmitting instruction for transmitting the image of the original is included in at least one of the above remote instructions, is carried out.

Figure 6:
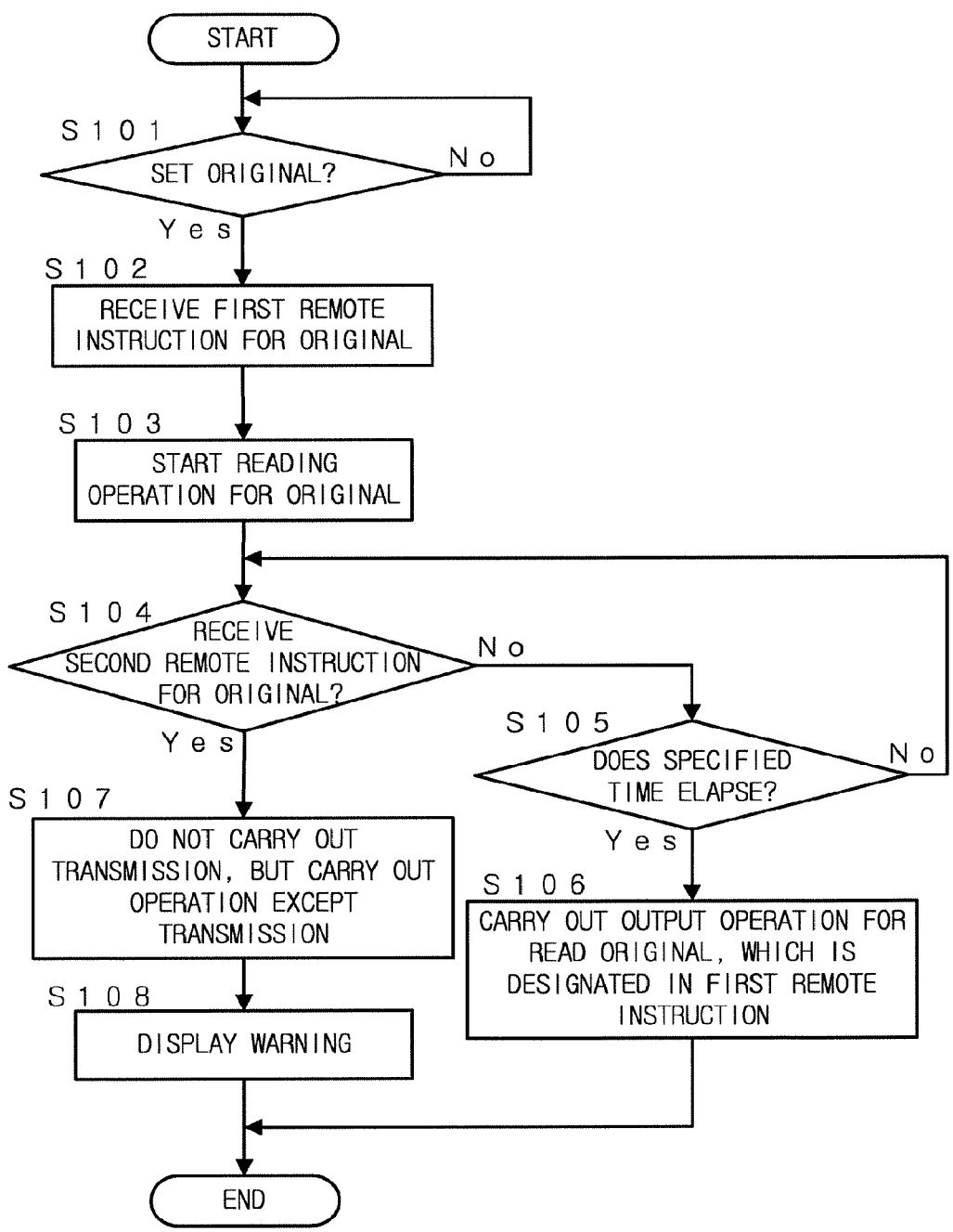
FIG. 6 is a flowchart showing the process relating to the information leak preventing operation carried out by the image forming apparatus according to the first embodiment.

FIG. 6 shows the flowchart of the process relating to the information leak preventing operation which is carried out by the image forming apparatus 10. After the original is set to the reading unit 22 (the platen glass or the auto document feeder 16) (Step S101; Yes), when the network communication unit 20 or the like receives the first remote instruction for the set original (Step S102), the CPU 11 immediately instructs the reading unit 22 to start the reading operation for the original set to the reading unit 22 (Step S103).

Then, while the reading operation is carried out, the CPU 11 waits for the reception of the second remote instruction during the specified time (for example, from 1 second to 3 seconds) (Step S104; No and Step S105; No). That is, the CPU 11 monitors whether the second remote instruction is received during the specified time (predetermined time) after the reading operation is started.

In case that the specified time elapses without receiving the second remote instruction (Step S104; No and Step S105; Yes), the image forming apparatus 10 carries out the output operation designated in the first remote instruction, for the original read by the reading unit 22 under the control of the CPU 11 (Step S106). Then, the process is ended. Specifically, in case that the first remote instruction is the copy instruction, the image forming apparatus 10 carries out the operation for printing the image on the recording paper by the print unit 24 based on the image data obtained by reading the original by using the reading unit 22. In case that the first remote instruction is the custom instruction for carrying out both the copy of the original and the transmission of the image of the original, the image forming apparatus 10 carries out the operation for printing the image on the recording paper by the print unit 24 based on the image data obtained by reading the original by using the reading unit 22, and the operation for transmitting the obtained image data to the designated destination.

In this case, when the first remote instruction is an instruction of the user different from the user who sets the original, because the reading operation for the original is started without transmitting the instruction from the user who sets the original, the user who sets the original becomes aware that the reading operation is started in accordance with the instruction of another user. Then, by taking the action for stopping the operation by pressing the stop button, the information leak caused by transmitting the image of the original in accordance with the remote instruction of another user, is prevented.

On the other hand, when the first remote instruction is an instruction of the user who sets the original, because the reading operation for the original is started at the timing of transmitting the first remote instruction, the user who sets the original recognizes that the image forming apparatus 10 is normally operated in accordance with the instruction of the user who sets the original even though the CPU 11 waits for the reception of the second remote instruction during the specified time. The user who sets the original does not feel any stresses. Further, the output operation is carried out in accordance with the instruction of the user who sets the original.

In case that the second remote instruction for the original set to the reading unit 22 is received before the specified time elapses since the first remote instruction is received (Step S105; No and Step S104; Yes), the image forming apparatus 10 does not carry out the transmission of the image of the original and carries out the output operation except the above transmission under the control of the CPU 11 (Step S107).

Specifically, in case that the first remote instruction is the copy instruction, the image forming apparatus 10 carries out the operation for printing the image on the recording paper by the print unit 24 based on the image data obtained by reading the original by using the reading unit 22. Further, even though the first remote instruction is the custom instruction for carrying out both the copy of the original and the transmission of the image of the original, the image forming apparatus 10 carries out only the operation for printing the image on the recording paper by the print unit 24 based on the image data obtained by reading the original by using the reading unit 22, and does not carry out the operation for transmitting the obtained image data.

In this case, because the first remote instruction and the second remote instruction are successionally received within the short time, whichever of the above instructions is the instruction of the user who sets the original, the user who sets the original recognizes that the reading operation for the original is started in accordance with the instruction of the user who sets the original. Therefore, even though the first remote instruction which is received prior to the second remote instruction is the instruction of another user, it is not expected that the user who sets the original becomes aware that the first remote instruction is received from another user and stops the operation by using the stop button. On the other hand, the image forming apparatus 10 cannot specify which of the user who transmits the first remote instruction and the user who transmits the second remote instruction is the user who sets the original.

Even though the transmitting instruction for transmitting the image of the original is included in the first remote instruction, the CPU 11 controls the transmitting unit, such as the network communication unit 20, the facsimile communication unit 25 or the like, so as not to carry out the transmission of the image of the original, which causes the information leak. That is, in case that the first remote instruction is the instruction of the user different from the user who sets the original, if the transmission of the image of the original is carried out, the image of the original is transmitted despite the intention of the user who sets the original. As a result, the information leak is caused. Therefore, the CPU 11 controls the network communication unit 20 or the like so as not to transmit the image of the original.

Regardless of whether the instruction of the user who sets the original is the first remote instruction or the second remote instruction, the results of the operation for the user who sets the original are as follows.

(1) In case that the user who sets the original instructs the image forming apparatus 10 to carry out only the copy of the original, the copy is carried out in accordance with the instruction.

(2) In case that the user who sets the original instructs the image forming apparatus 10 to carry out both the copy of the original and the transmission of the image of the original, only the copy is carried out, but the above transmission is not carried out.

(3) In case that the user who sets the original instructs the image forming apparatus 10 to carry out only the transmission of the image of the original, only the reading of the original is carried out, but the above transmission is not carried out.

As described above, in case of the above (2) and (3), the situation in which the operation for transmitting the image of the original in accordance with the instruction of the user who sets the original is not carried out, is caused. Therefore, the display unit 18 displays the warning that the transmission of the image of the original is not carried out because the first remote instruction and the second remote instruction are successionally received, as the warning unit (Step S108). Then, the process is ended. The above warning may be displayed only in case that the transmitting instruction for transmitting the image of the original is included in at least one of the first remote instruction and the second remote instruction.

By the displayed warning, the user who sets the original recognizes that the above transmission is not carried out. Therefore, the user can enter the transmitting instruction for transmitting the image of the original again, if necessary.

Figure 7:
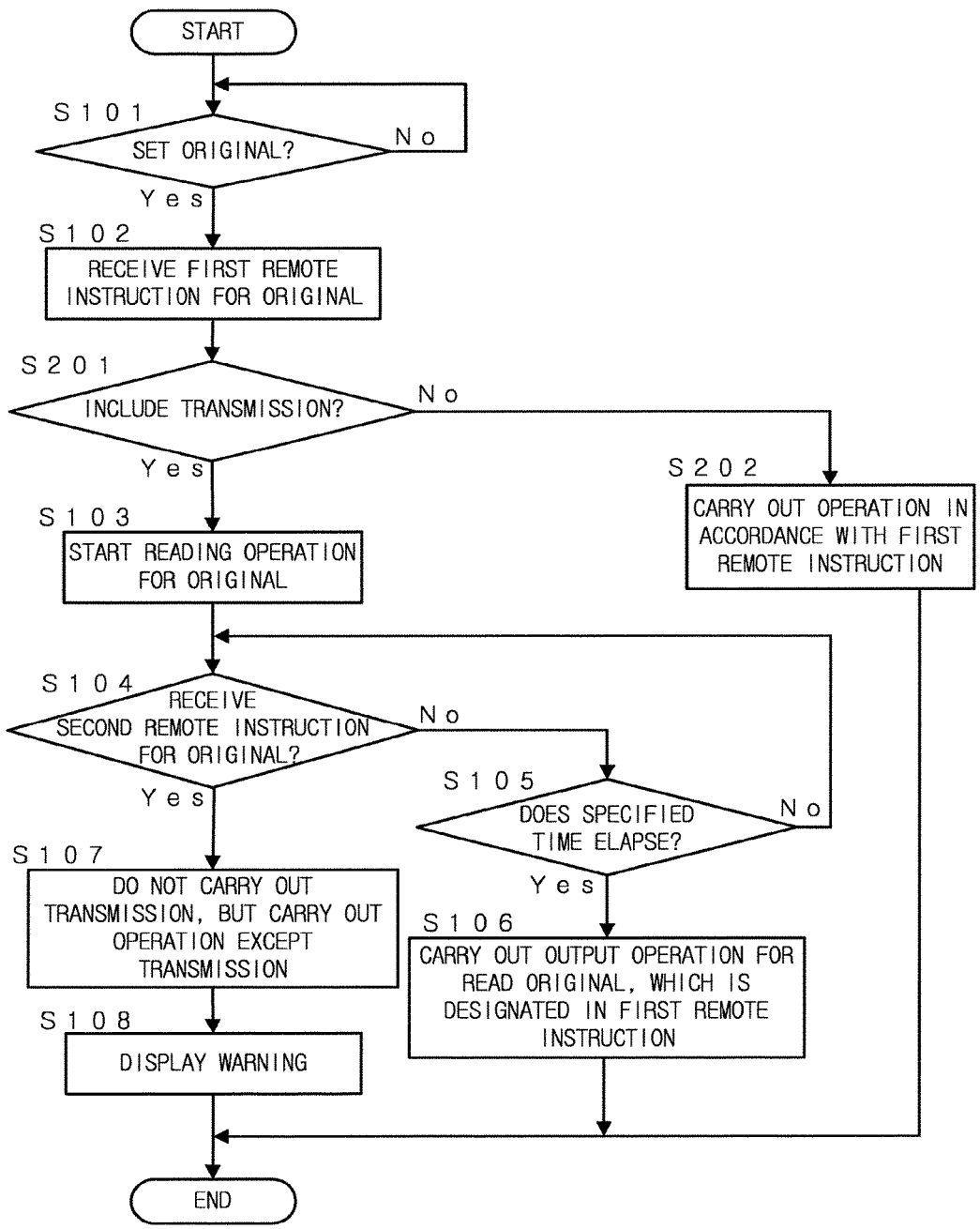
FIG. 7 is a flowchart showing a modified example of the process relating to the information leak preventing operation shown in FIG. 6.

FIG. 7 shows a modified example of the process relating to the information leak preventing operation which is carried out by the image forming apparatus 10. The steps which are the same as those shown in FIG. 6 are denoted by the same step numbers, respectively. The explanation of the same steps is omitted.

In the process relating to the modified example shown in FIG. 7, only in case that the transmitting instruction for transmitting the image of the original is included in the first remote instruction (Step S201; Yes), the image forming apparatus 10 carries out the process following Step S103 in the same manner of FIG. 6 under the control of the CPU 11. In case that the transmitting instruction for transmitting the image of the original is not included in the first remote instruction (Step S201; No), the image forming apparatus 10 carries out the operation in accordance with the received first remote instruction under the control of the CPU 11 (Step S202). Then, the process is ended.

In the modified example shown in FIG. 7, in case that the transmitting instruction for transmitting the image of the original is not included in the first remote instruction, the operation for waiting for the reception of the second remote instruction during the specified time is not carried out.

Therefore, it is possible to start the output operation in accordance with the first remote instruction earlier.

Next, the image forming apparatus 10 according to the second embodiment will be explained. In the second embodiment, the configuration of the image forming system 3 is the same as that of the image forming system 3 explained in the first embodiment. Further, the configuration of the image forming apparatus 10 is the same as that of the image forming apparatus 10 according to the first embodiment. The explanation thereof is omitted.

Figure 8:
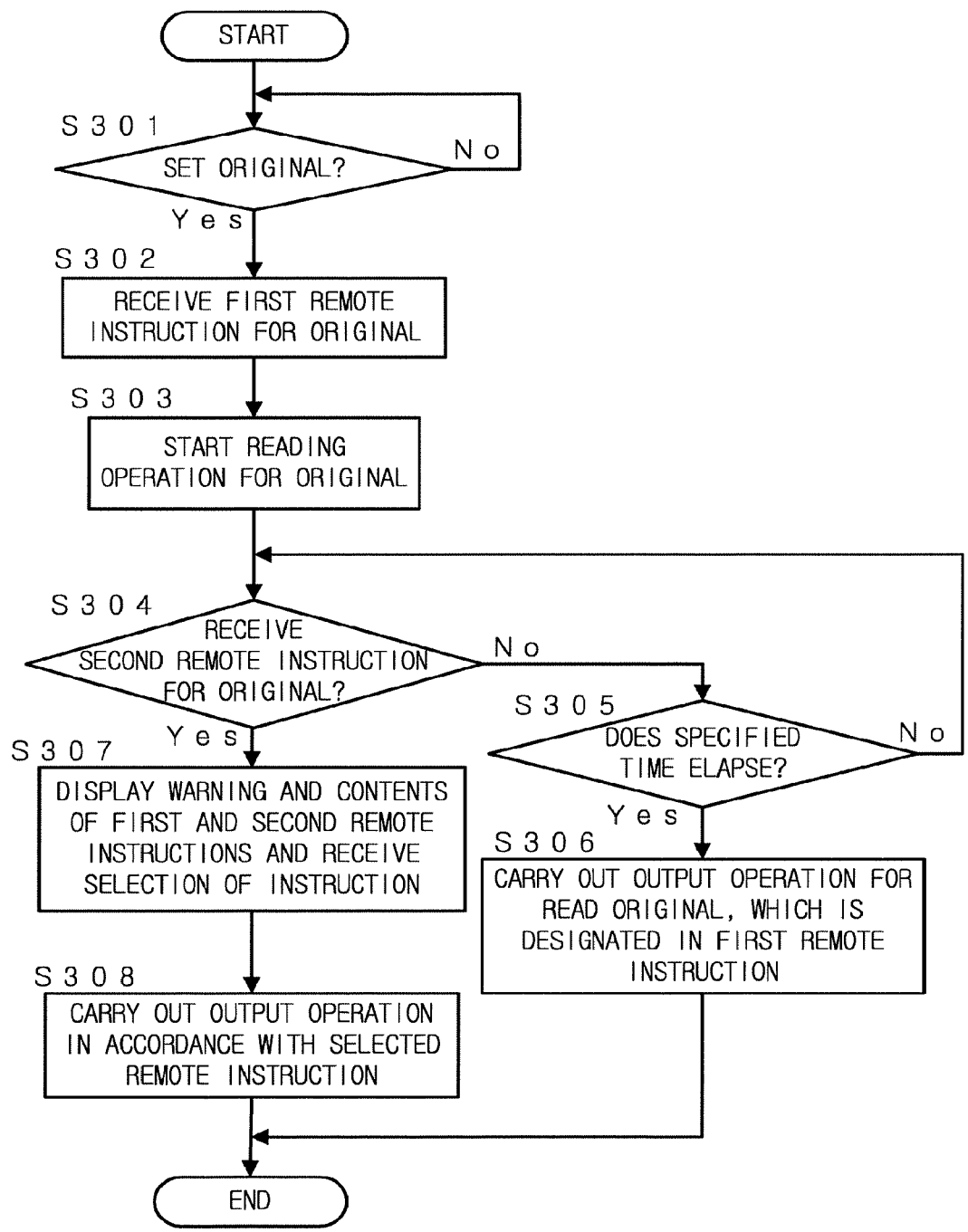
FIG. 8 is a flowchart showing the process relating to the information leak preventing operation carried out by the image forming apparatus according to the second embodiment.

FIG. 8 shows the flowchart of the process relating to the information leak preventing operation which is carried out by the image forming apparatus 10 according to the second embodiment. After the original is set to the reading unit 22 (Step S301; Yes), when the network communication unit 20 or the like of the image forming apparatus 10 receives the first remote instruction for the set original (Step S302), the CPU 11 instructs the reading unit 22 to start the reading operation for the original set to the reading unit 22 (Step S303).

Then, while the reading operation is carried out, the CPU 11 waits for the reception of the second remote instruction during the specified time (for example, from 1 second to 3 seconds) (Step S304; No and Step S305; No). That is, the CPU 11 monitors whether the second remote instruction is received during the specified time (predetermined time) after the reading operation is started.

In case that the specified time elapses without receiving the second remote instruction (Step S304; No and Step S305; Yes), the image forming apparatus 10 carries out the output operation designated in the first remote instruction, for the original read by the reading unit 22 under the control of the CPU 11 (Step S306). Then, the process is ended.

In case that the first remote instruction is an instruction of the user different from the user who sets the original, because the reading operation for the original is started without transmitting the instruction from the user who sets the original, the user who sets the original becomes aware that the reading operation is started in accordance with the instruction of another user. Then, by taking the action for stopping the operation by pressing the stop button, the information leak caused by transmitting the image of the original without the intention of the user who sets the original, is prevented.

On the other hand, when the first remote instruction is an instruction of the user who sets the original, because the reading operation for the original is started at the timing of transmitting the first remote instruction, the user who sets the original recognizes that the image forming apparatus 10 is normally operated in accordance with the instruction of the user who sets the original even though the CPU 11 waits for the reception of the second remote instruction during the specified time. The user who sets the original does not feel any stresses. Further, the output operation is carried out in accordance with the instruction of the user who sets the original.

In case that the second remote instruction for the original set to the reading unit 22 is received before the specified time elapses since the first remote instruction is received (Step S305; No and Step S304; Yes), because the first remote instruction and the second remote instruction are successionally received within the short time, the image forming apparatus 10 receives the selection of the remote instruction to be used to operate the image forming apparatus 10, by asking the user who sets the original about the instruction to be selected (Step S305).

Figure 9:
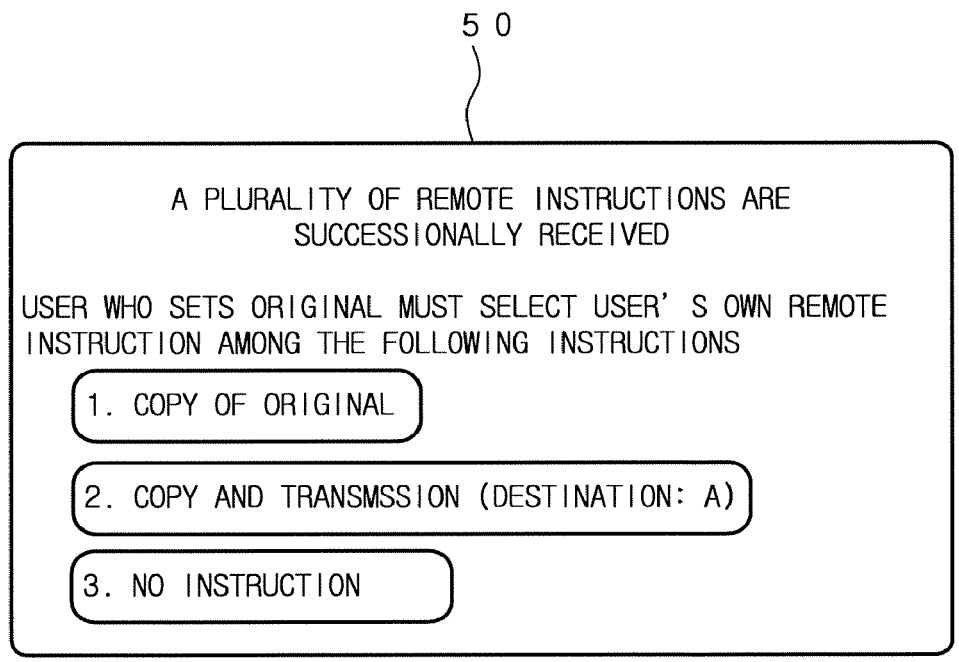
FIG. 9 is a view showing an example of the warning/selection window.

Specifically, the CPU 11 instructs the display unit 18 of the image forming apparatus 10 to display the warning message and the contents of each remote instruction. The image forming apparatus 10 receives the selection operation for selecting the remote instruction to be used to operate the image forming apparatus 10, from the operating unit 17. In the display, the CPU 11 instructs the display unit 18 to display, for example, the warning/selection window 50 as shown in FIG. 9, so as to enable the user who sets the original to judge the instruction to be selected, and the selection operation is received by the operating unit 17. Because it is assumed that the user who sets the original is near the image forming apparatus 10, the CPU 11 instructs the display unit 18 of the image forming apparatus 10 to display the warning/selection window 50 in order to receive the above selection from the user who sets the original. Then, the selection operation is received by the operating unit 17.

In case that every one of a plurality of received remote instructions is an instruction of a user different from the user who sets the original, by providing the selection button "No instruction" (corresponding to "cancel") as shown in FIG. 9, it is possible to solve the problem relating to the information leak. That is, the user who sets the original can cancel all of the remote instructions from other users. Alternatively, it is not necessary to provide the selection button "No instruction" (corresponding to "cancel"). As a reason thereof, in case that the user who sets the original does not transmit the remote instruction, the user who sets the original becomes aware that the reading operation for the set original is started in accordance with the remote instruction of another user, and can take the action for stopping the operation by pressing the stop button, and the like.

When the image forming apparatus 10 receives the above selection operation, the image forming apparatus 10 carries out the output operation in accordance with the selected remote instruction under the control of the CPU 11 (Step S308). Alternatively, in case that all of the instructions are cancelled, the image forming apparatus 10 does not carry out the output operation. Then, the process is ended.

As described above, in case that a plurality of remote instructions are successively received within the short time, it is possible to certainly carry out the operation in accordance with the remote instruction of the user who sets the original by asking the user who sets the original about the instruction to be selected.

Figure 10:
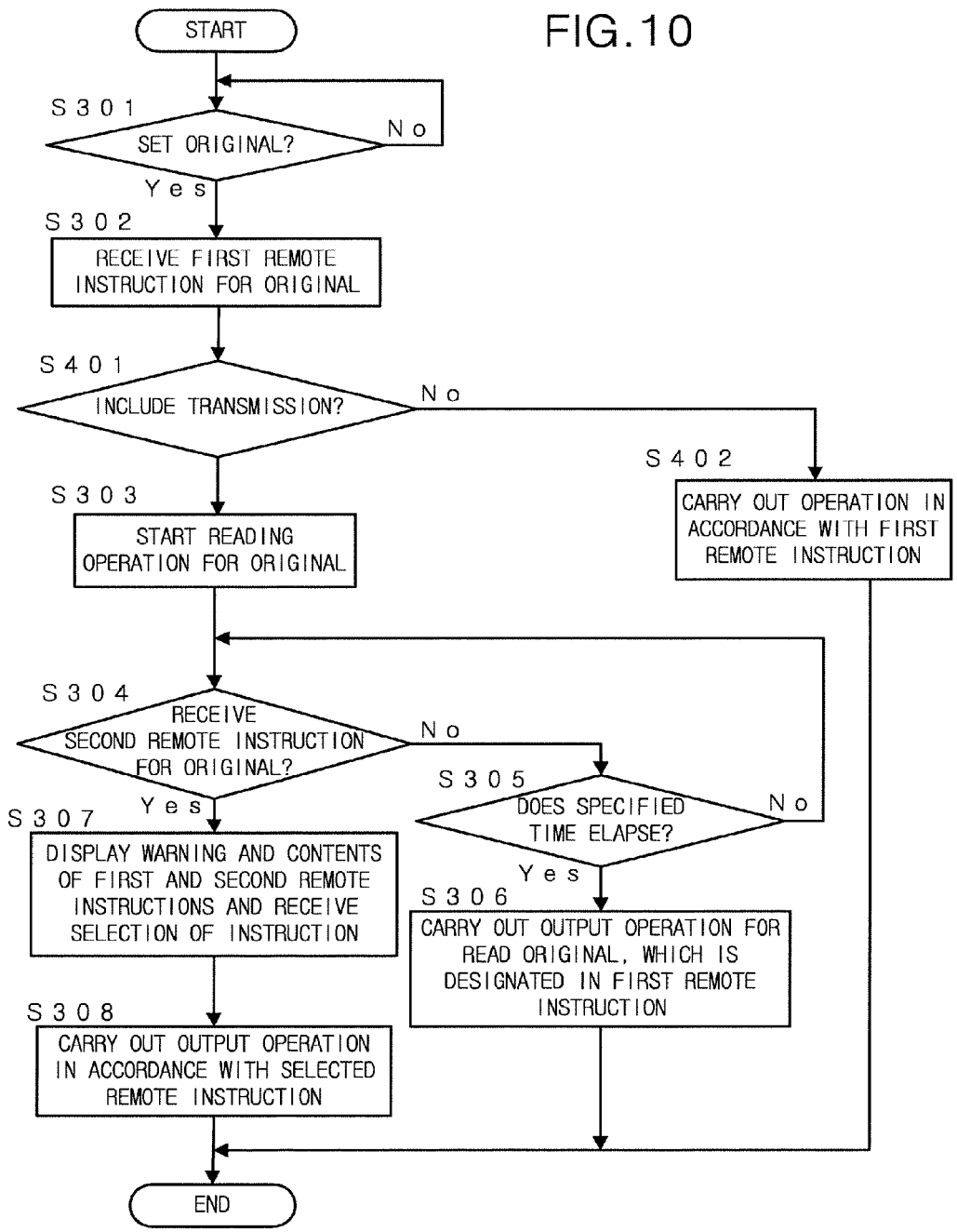
FIG. 10 is a flowchart showing a modified example of the process relating to the information leak preventing operation shown in FIG. 8.
Figure 11A:
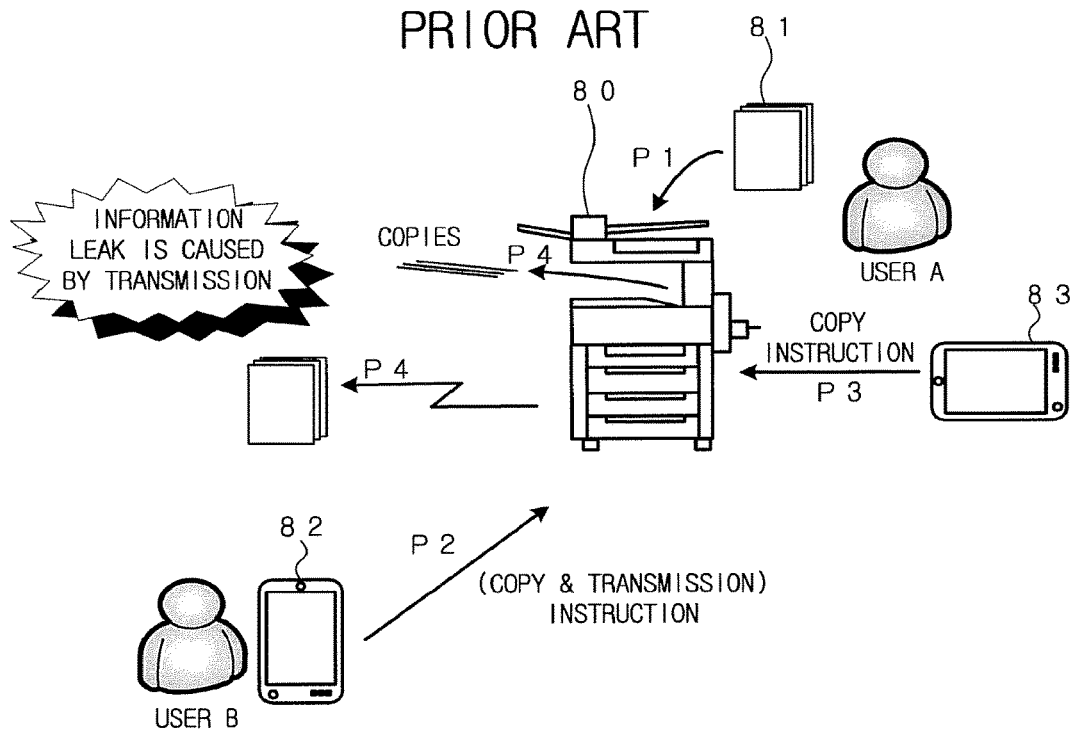
FIGS. 11A and 11B are views showing a workflow and a sequence in case that the information leak is caused by the transmission of the image of the original, which is not intended by the user who sets the original, in a conventional multi function peripheral.
Figure 11B:
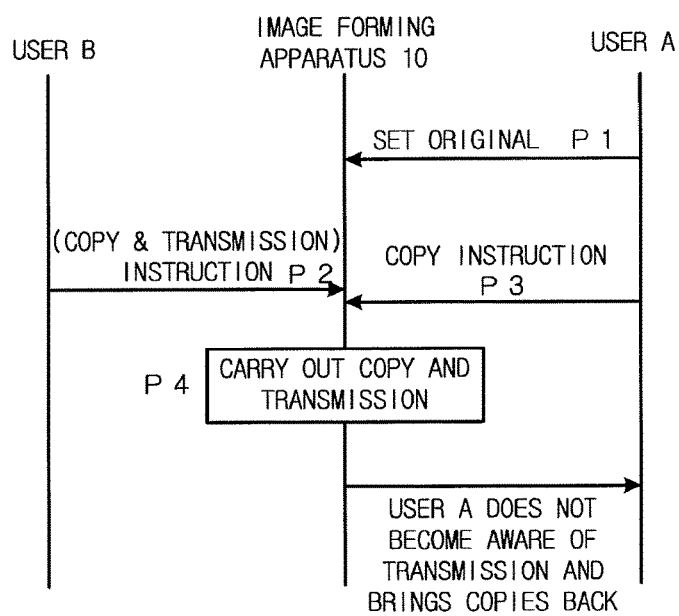

FIG. 10 shows a modified example of the process relating to the information leak preventing operation which is carried out by the image forming apparatus 10 according to the second embodiment. The steps which are the same as those shown in FIG. 8 are denoted by the same step numbers, respectively. The explanation of the same steps is omitted.

In the process relating to the modified example shown in FIG. 10, only in case that the transmitting instruction for transmitting the image of the original is included in the first remote instruction (Step S401; Yes), the image forming apparatus 10 carries out the process following Step S303 in the same manner of FIG. 8 under the control of the CPU 11. In case that the transmitting instruction for transmitting the image of the original is not included in the first remote instruction (Step S401; No), the image forming apparatus 10 carries out the operation in accordance with the received first remote instruction under the control of the CPU 11 (Step S402). Then, the process is ended.

In the modified example shown in FIG. 10, in case that the transmitting instruction for transmitting the image of the original is not included in the first remote instruction, the image forming apparatus 10 does not wait for the reception of the second remote instruction until the specified time elapses. Therefore, it is possible to start the output operation in accordance with the first remote instruction earlier.

As described above, in the first and the second embodiments, in case that a plurality of remote instructions for the set original are successively received within the short time, the information leak caused by transmitting the image of the original despite the intention of the user who sets the original is prevented.

Further, the reading operation for the original is immediately started when the first remote instruction is received. Therefore, in case that the user who sets the original has not transmitted the remote instruction, by the situation in which the reading operation is started, the above user can become aware that the above reading operation is started in accordance with the remote instruction of another user. On the other hand, in case that the user who sets the original transmits the first remote instruction, the reading operation for the set original is immediately started in accordance with the instruction of the user who sets the original. Therefore, even though the CPU 11 waits for the reception of the second remote instruction until the specified time elapses, the user who sets the original does not suffer the stress.

Further, in case that the image of the original is not transmitted, the warning is displayed. Therefore, in case that the user who sets the original transmits the transmitting instruction for transmitting the image of the original, the user can be prompted to transmit the transmitting instruction for transmitting the image of the original, again.

In the second embodiment, in case that a plurality of remote instructions are successively received within the short time, the user who sets the original is asked about the instruction to be selected. Therefore, it is possible to certainly carry out the operation in accordance with the remote instruction of the user who sets the original.

As described above, the embodiments are explained by using the drawings. However, in the present invention, the concrete configuration is not limited to the above embodiments. In the present invention, various modifications of the above embodiments or the addition of various functions or the like to the embodiments can be carried out without departing from the gist of the invention.

In the embodiments, the case in which the first and the second remote instructions are received is described. However, before the specified time elapses, the CPU 11 may wait for the reception of any number of the remote instructions. Then, in case that two or more remote instructions are received, the transmission of the image of the original is not carried out or the selection of the remote instruction is received after the user is asked about the instruction to be selected.

In the embodiments, the case in which the first remote instruction and the second remote instructions are received is explained. However, as long as at least one of the first execution instruction and the second execution instruction is a remote instruction, the other instruction may be an instruction which is received by the operating unit 17 of the image forming apparatus 10 (referred to as the local instruction). Specifically, the job execution instruction including the reading of the original, which is received from the user in Step S102 or Step S104 of FIGS. 6 and 7, or in Step S302 or S304 of FIGS. 8 and 10, may be the remote instruction or the local instruction. Then, in case that "Yes" is selected in Step S104 or Step S304 (that is, in case that the job execution instruction including the reading of the original is received before the specified time elapses since the job execution instruction is received in Step S102 or Step 302), the CPU 11 judges whether at least one of the two execution instructions received in Step S102 and Step S104 or in Step S302 and Step S304 is the remote instruction or not. In case that at least one of the two execution instructions is the remote instruction, the process proceeds to Step S107 or Step S307. In case that neither one of the two execution instructions is the remote instruction, for example, the process is carried out so as to operate the image forming apparatus 10 in accordance with the instruction received in Step S102 or Step S302.

Further, in case that the execution instruction which is first received after setting the original is the local instruction, the image forming apparatus 10 executes a job in accordance with the received local instruction and is not required to carry out the operation for waiting for the reception of the second remote instruction. Specifically, in Step S102 of FIGS. 6 and 7 or in Step S302 of FIGS. 8 and 10, the CPU 11 judges whether the execution instruction received from the user is the remote instruction or not. Only in the case that the above instruction is the remote instruction, the process proceeds to the next step in each flowchart. In case of the local instruction, the image forming apparatus 10 may execute a job in accordance with the local instruction and end the process under the control of the CPU 11. In this case, the job execution instruction received in Step S104 of FIGS. 6 and 7 or in Step S304 of FIGS. 8 and 10 may be the remote instruction or the local instruction.

In the embodiments, the copy and the transmission are explained as examples of the instructions. However, the instruction except the transmission is not limited to the copy, and may be the instruction including at least the reading of the original. For example, the instruction may be the remote instruction for reading the original to obtain the image data and for storing the obtained image data in a predetermined box.

One of the objects of the above embodiments is to provide an image forming apparatus and a tangible computer-readable recording medium, which can prevent the information leak from being caused by transmitting the image of the original in accordance with the remote instruction of another user before the user who sets the original becomes aware of the transmission of the image of the original.

In at least one of the above embodiments, in case that the first execution instruction for executing a first job including the reading of the original set to the reading unit and the second execution instruction for executing a second job including the reading of the original set to the reading unit are successionally received within the predetermined time, and in case that at least one of the first execution instruction and the second execution instruction is a remote instruction received from an external terminal, the image forming apparatus does not transmit the image of the original even though the transmitting instruction for transmitting the image of the original is included in both or one of the first execution instruction and the second execution instruction.

In at least one of the above embodiments, the control unit instructs the reading unit to start the reading of the original at the timing of receiving the first execution instruction, and monitors whether the second execution instruction is received in the situation in which the reading of the original is carried out. Because the reading of the original is started, in case that the first execution instruction is not an instruction of the user who sets the original, the user who sets the original becomes aware that the reading of the original is started in accordance with the instruction of another user. Therefore, the user can take the action for stopping the operation, or the like.

In at least one of the above embodiments, in case that the transmitting instruction for transmitting the image of the original is not included in the first execution instruction, even though the first execution instruction is an instruction of a user different from the user who sets the original, the information leak is not caused by operating the image forming apparatus in accordance with the above first execution instruction. Therefore, the image forming apparatus is operated in accordance with the first execution instruction without waiting for the reception of the second execution instruction.

In at least one of the above embodiments, in case that the first execution instruction is received by the operating unit of the image forming apparatus, it is assumed that the first execution instruction is an instruction of the user who sets the original. Because the information leak is not caused by operating the image forming apparatus in accordance with the first execution instruction, the image forming apparatus is operated in accordance with the first execution instruction without waiting for the reception of the second execution instruction.

In at least one of the above embodiments, the image forming apparatus warns the user that the image of the original is not transmitted. Thereby, the user can enter the transmitting instruction for transmitting the image of the original again, if necessary.

In at least one of the above embodiments, in case that the first execution instruction for executing a first job including the reading of the original set to the reading unit and the second execution instruction for executing a second job including the reading of the original set to the reading unit are successionally received within the predetermined time, and in case that at least one of the first execution instruction and the second execution instruction is a remote instruction received from an external terminal, the contents of these execution instructions are displayed on the operation display unit of the image forming apparatus to receive the selection of the execution instruction to be used to operate the image forming apparatus and the image forming apparatus is operated in accordance with the selected execution instruction. Because it is assumed that the user who sets the original is near the image forming apparatus, the selection operation is received by the operation display unit of the image forming apparatus in order to receive the selection from the user who sets the original.

According to the image forming apparatus and the tangible computer-readable recording medium, it is possible to prevent the information leak from being caused by transmitting the image of the original in accordance with the remote instruction of another user before the user who sets the original becomes aware of the transmission of the image of the original.

The present U.S. patent application claims the priority of Japanese Patent Application No. 2012-262709, filed on Nov. 30, 2012, according to the Paris Convention, and the entirety of which is incorporated herein by reference for correction of incorrect translation.

What is claimed is:
1. An image forming apparatus, comprising:
an image sensor to optically read an original;
a printer to print an image of the original, which is obtained by the image sensor, on recording paper;

a transmitting unit to transmit the image of the original, which is obtained by the image sensor, to an external device;

a hardware processor configure to:

receive a first execution instruction for executing a first job that includes reading of the original by the image sensor and a second execution instruction for executing a second job that includes reading of the original by the image sensor; and determine whether the second execution instruction is received within a predetermined time after the first execution instruction is received, wherein at least one of the first execution instruction and the second execution instruction is a remote instruction received from an external terminal, and a transmitting instruction for transmitting the image of the original is included in both the first execution instruction and the second execution instruction or included in the first execution instruction, upon a determination by the hardware processor that the second execution instruction is received within the predetermined time, the hardware processor controls the image sensor, the printer and the transmitting unit so as to execute the received first execution instruction except for the transmitting instruction to transmit the image of the original, otherwise the hardware processor controls the image sensor, the printer and the transmitting unit so as to execute the received first execution instruction including the transmitting instruction.

2. The image forming apparatus of claim 1, wherein the hardware processor instructs the image sensor to start the reading of the original when the hardware processor receives the first execution instruction, and monitors whether the second execution instruction is received during the predetermined time after the reading of the original is started.

3. The image forming apparatus of claim 1, wherein
the hardware processor monitors whether the second execution instruction is received during the predetermined time after the first execution instruction is received.

4. The image forming apparatus of claim 1, wherein in case that the first execution instruction is received by an operating unit of the image forming apparatus, the hardware processor instructs the image forming apparatus to carry out an operation designated in the first execution instruction, and
only in case that the first execution instruction is the remote instruction, the hardware processor monitors whether the second execution instruction is received during the predetermined time after the first execution instruction is received.

5. The image forming apparatus of claim 1, further comprising a warning unit to warn a user in case that the image of the original is not transmitted even though the transmitting instruction for transmitting the image of the original is included in both or one of the first execution instruction and the second execution instruction.

6. A non-transitory computer-readable recording medium storing a program therein, wherein the program causes an image forming apparatus to:
optically read an original by using an image sensor of the image forming apparatus;
print an image of the original, which is obtained by the image sensor, on recording paper by using a printer of the image forming apparatus;

transmit the image of the original, which is obtained by the image sensor, to an external device by using a transmitting unit of the image forming apparatus;

use a hardware processor of the image forming apparatus to receive a first execution instruction for executing a first job that includes reading of the original by the image sensor and a second execution instruction for executing a second job that includes reading of the original by the image sensor; and use the hardware processor to determine whether the second execution instruction is received within a predetermined time after the first execution instruction is received, wherein at least one of the first execution instruction and the second execution instruction is a remote instruction received from an external terminal, and a transmitting instruction for transmitting the image of the original is included in both the first execution instruction and the second execution instruction or in the first execution instruction, upon a determination by the hardware processor that the second execution instruction is received within the predetermined time, the hardware processor controls the image sensor, the printer and the transmitting unit so as to execute the received first execution instruction except for the transmitting instruction to transmit the image of the original, otherwise the hardware processor controls the image sensor, the printer and the transmitting unit so as to execute the received first execution instruction including the transmitting instruction.

7. The non-transitory computer-readable recording medium of claim 6, wherein the hardware processor instructs the image sensor to start the reading of the original when the hardware processor receives the first execution instruction, and monitors whether the second execution instruction is received during the predetermined time after the reading of the original is started.

8. The non-transitory computer-readable recording medium of claim 6, wherein
the hardware processor monitors whether the second execution instruction is received during the predetermined time after the first execution instruction is received.

9. The non-transitory computer-readable recording medium of claim 6, wherein in case that the first execution instruction is received by an operating unit of the image forming apparatus, the hardware processor instructs the image forming apparatus to carry out an operation designated in the first execution instruction, and
only in case that the first execution instruction is the remote instruction, the hardware processor monitors whether the second execution instruction is received during the predetermined time after the first execution instruction is received.

10. The non-transitory computer-readable recording medium of claim 6, wherein the program causes the image forming apparatus to warn a user by using a warning unit in case that the image of the original is not transmitted even though the transmitting instruction for transmitting the image of the original is included in both or one of the first execution instruction and the second execution instruction.

* * * * *